(12) United States Patent
Lu et al.

(10) Patent No.: US 11,420,140 B2
(45) Date of Patent: Aug. 23, 2022

(54) INTEGRATED SEPARATION UNIT FOR MICROPLASTICS IN THE COASTAL SEDIMENTS AND COLLECTION METHOD OF MICROPLASTICS

(71) Applicant: Zhejiang Shuren College (Zhejiang Shuren University), Zhejiang (CN)

(72) Inventors: Yin Lu, Zhejiang (CN); Wenyong Weng, Zhejiang (CN); Mingli Ye, Zhejiang (CN); Qing Ma, Zhejiang (CN); Xiaolu Xu, Zhejiang (CN); Deyong Zhang, Zhejiang (CN)

(73) Assignee: ZHEJIANG SHUREN COLLEGE (ZHEJIANG SHUREN UNIVERSITY)

( * ) Notice: Subject to any disclaimer, the term of this patent is extended or adjusted under 35 U.S.C. 154(b) by 101 days.

(21) Appl. No.: 17/029,947

(22) Filed: Sep. 23, 2020

(65) Prior Publication Data
US 2021/0260501 A1    Aug. 26, 2021

(30) Foreign Application Priority Data
Feb. 21, 2020    (CN) .......................... 202010108797.2

(51) Int. Cl.
*B01D 29/00*    (2006.01)
*B01D 21/02*    (2006.01)
*B01D 21/26*    (2006.01)
(Continued)

(52) U.S. Cl.
CPC ........... *B01D 29/085* (2013.01); *B01D 21/02* (2013.01); *B01D 21/265* (2013.01); *B01D 61/18* (2013.01); *B01D 2257/70* (2013.01)

(58) Field of Classification Search
CPC .... B01D 29/085; B01D 21/02; B01D 21/265; B01D 61/18; B01D 2257/70;
(Continued)

(56) References Cited

U.S. PATENT DOCUMENTS 2,540,474 A * 2/1951 Cox ................... B01D 21/26
 210/313
2,835,387 A * 5/1958 Fontein ............... B01D 21/34
 209/731
(Continued)

OTHER PUBLICATIONS

Joana Correia Prata et al, "Methods for sampling and detection of microplastics in water and sediment: A critical review", published in Trends in Analytical Chemistrty, vol. 110, 2019, pp. 150-159. (Year: 2019).*
Julie Masura et al, "Laboratory Methods for the Analysis of Microplastics in the Marine Environment: Recommendations for quantifying synthetic particles in waters and sediments", published by NOAA Marine Debris Program, U.S. Department of Commerce, Technical Memorandum NOS-OR&R-48, Jul. 2015. (Year: 2015).*

*Primary Examiner* — Joseph W Drodge
(74) *Attorney, Agent, or Firm* — Snell & Wilmer LLP

(57) ABSTRACT

The disclosure provides an integrated separation unit for microplastics in the coastal sediments and a collection method of microplastics, belonging to the technical field of water treatment. The unit includes: a holder, a separation cylinder, a collection bottle, a central baffle plate, a baffle plate control knob, a stirring propeller, a motor, a cylinder switch, a filtration screen, a welding nozzle, a filter membrane and a vacuum pump. Using this unit for microplastic collection has the advantages of easy operation, economical and environment-friendly, high separation efficiency, and high durability.

6 Claims, 2 Drawing Sheets

(51) Int. Cl.
*B01D 61/18* (2006.01)
*B01D 29/085* (2006.01)

(58) Field of Classification Search
CPC .. B01D 21/0012; B01D 21/262; B01D 61/16; B01D 2311/04; B01D 2311/12; B01D 2311/2642; B01D 2313/20; B01D 2313/50; B01D 61/14; B01D 21/26; B01D 36/04; B01D 21/0018; B01D 21/2444; B01D 21/28; B01D 2311/2676; B01D 36/003; B01D 36/045; G01N 1/34; G01N 21/84; G01N 1/04; G01N 2035/00465; G01N 2035/00475; G01N 2035/00485; G01N 2035/00495; G01N 2035/00524; G01N 2035/00534; B01L 9/00; B01L 2200/0652
See application file for complete search history.

(56) References Cited

U.S. PATENT DOCUMENTS

| | | | | |
|---|---|---|---|---|
| 3,347,101 | A * | 10/1967 | Kennedy | G01N 1/04 175/58 |
| 3,539,155 | A * | 11/1970 | Agranat | B01D 61/145 210/223 |
| 5,149,423 | A * | 9/1992 | Piepho | B01D 21/0018 210/219 |
| 6,249,344 | B1 * | 6/2001 | Virag | G01N 15/05 356/244 |
| 2012/0065047 | A1 * | 3/2012 | Chapman | B01L 3/5021 422/548 |
| 2014/0377880 | A1 * | 12/2014 | Emburgh | G01N 1/44 422/561 |
| 2021/0123936 | A1 * | 4/2021 | Swanson | B01F 23/808 |

* cited by examiner

INTEGRATED SEPARATION UNIT FOR MICROPLASTICS IN THE COASTAL SEDIMENTS AND COLLECTION METHOD OF MICROPLASTICS

TECHNICAL FIELD

The disclosure pertains to the technical field of water treatment, and specifically pertains to an integrated separation unit for microplastics in the coastal sediments and a collection method of microplastics.

BACKGROUND

Since it was defined by Science in 2004, microplastics (i.e., plastics would gradually decompose into fragments or particles smaller than 5 mm in size under the influence of physical action, biodegradation, photodegradation and other processes), as a new kind of persistent organic pollutants, have the characteristics of wide distribution, slow degradation and complex toxicology. In 2015, microplastics were listed as the second major scientific issue in the field of environmental and ecological science, becoming a major global environmental issue along with global climate change, ozone depletion and ocean acidification, and attracting more and more attention from the international community.

The main components of microplastics in the environment include polyethylene (PE), polypropylene (PP), polyvinyl chloride (PVC), polyester (PET), polystyrene (PS) and polyamide (PA) and the like, which can be divided into terrigenous sources (75~90%) and sea sources (10~25%). According to statistics, 129 coastal countries in the world pour about 4.8 to 12.7 million tons of plastic wastes into the oceans each year. These plastics produce huge amounts of microplastics through physical, chemical or biological processes, forming closed and highly abundant pollution aggregated flows in the five major circulation areas on the ocean surface (Figure). East Asian seas have been the worst affected areas with microplastic pollution. As the world's largest plastic producer and consumer, China has become the country that pours the most plastic wastes into the sea (annual emission is about 2.4 million tons, accounting for 30% of the global total amount). According to Bulletin of China's Marine Environmental Status of China for the year of 2017 released by the State Oceanic Administration, the average density of floating microplastics in the surface waters of six monitored sections in the Bohai Sea, the Yellow Sea, the East China Sea and the northern part of the South China Sea is much higher than that of other regions in the world. Additionally, the pollution of microplastics in inland waters of China is increasingly serious. For example, the mouth of the Yangtze River in the East China Sea, the coastal zones of Shandong Peninsula, and the southern water system of Taihu Basin are all polluted by microplastics to varying degrees. Even more, microplastics have been detected on the Qinghai-Tibet Plateau, known as the third pole of the world, where human activities are limited.

On Nov. 30, 2018, Wang Juying, the deputy director of the National Marine Environmental Monitoring Center, said that, microplastics have been found in seawater as well as on the seafloor and in the submarine sediments. Most microplastics in the environment result from the breaking and degradation of plastics. Microplastics have large specific surface areas, which can enrich persistent organic pollutants and heavy metals, and serve as carriers of exotic species and pathogenic microorganisms. Meanwhile, the additives used in the production of plastics are toxic in nature. Therefore, microplastics are not only the source of marine pollutants, but also the carriers of toxic pollutants.

Therefore, microplastics are widespread in the environment as a new pollutant, while the methods for the analysis of microplastics in Marine sediments remain to be developed. However, due to the lack of monitoring and investigation of Marine microplastic pollution at present, we still lack a comprehensive understanding of the pollution degree of Marine microplastics, including the categories, concentrations, distributions and change rules of microplastics. The density separation method proposed by Thompson et al is mostly used to extract microplastics from sediments. Different from the separation of microplastics in liquid medium such as seawater, the separation of microplastics in the submarine sediments is complicated due to the presence of sediment particles. Internationally, microplastics in the sediments are usually separated by flotation or elutriation to reduce the mass (volume) of the treated samples, and then the microplastics in the flotation solution are separated by screening or filtration. The separation of microplastics in the sediments mainly adopts the density method, including removing organic matters, removing non-microplastics with larger and smaller densities, and finally obtaining microplastic particles and testing. Sodium chloride solution is widely used as the flotation solution. Some scholars also choose natural seawater, sodium polytungstate and sodium iodide for eluting microplastics; however, sodium polytungstate and sodium iodide may cause pollution to the environment and have high economic cost. Some scholars have developed columnar separation unit to separate microplastics, but it also has some disadvantages such as high cost, complicated operation and poor stability of separation effects. Due to the complicated steps, the transfer of microplastics is greatly affected by human operation. Therefore, it is difficult to achieve a stable and accurate concentration value, so that we have a deviation on the pollution characteristics of microplastics.

SUMMARY

In view of the deficiency in the prior art, the present invention provides an integrated separation unit for microplastics in the coastal sediments and a collection method of microplastics, which can realize the separation of microplastics from the sediments in water rapidly and efficiently.

The objective of the invention is achieved through the following technical scheme: an integrated separation unit for microplastics in the coastal sediments, the unit includes: a holder, a separation cylinder, a collection bottle, a central baffle plate, a baffle plate control knob, a stirring propeller, a motor, a cylinder switch, a filtration screen, a welding nozzle, a filter membrane and a vacuum pump; the holder is connected to one end of the separation cylinder through screw threads, and the other end of the separation cylinder is connected to the collection bottle through a bayonet; the inner bottom of the separation cylinder is provided with a stirring propeller, the stirring propeller is connected to a motor, the cylinder switch is arranged on the outer wall of the separation cylinder, and the motor is connected with the cylinder switch; the central baffle plate is arranged in the inner center of the separation cylinder, the central baffle plate is circular, a rotating shaft is arranged along one diameter of the central baffle plate, one end of the rotating shaft passes through the separation cylinder and connected with the baffle plate control knob; a filtration screen is arranged at the neck of the collection bottle, and the filtration screen is provided with a filter membrane, a welding nozzle is arranged at the lower side of the collection bottle, and the welding nozzle is connected with the vacuum pump.

Further, the diameter of the central baffle plate is equal to the inner diameter of the separation cylinder.

Further, the filter membrane is an aqueous filter membrane.

Further, the aperture of the filter membrane is selected from 0.15 μm, 0.22 μm, 0.45 μm, 0.80 μm or 1.20 μm.

The present invention further includes a method of collecting microplastics using the integrated separation unit for microplastics, specifically including the following steps:

(1) Sampling: water sampling sites were selected to obtain sediment samples;

(2) Pre-treatment: the debris in the sediment samples was filtered out over 1~5-mesh stainless steel screens, dried at 100~110° C. for 1~2 h, taken out and cooled to room temperature to obtain the sediments to be separated;

(3) Separation: the baffle plate control knob was adjusted to make the central baffle plate in the separation cylinder parallel to the barrel body of the separation cylinder; the sediments to be separated obtained from step (2) were poured into the separation cylinder, into which was also added the saturated NaCl solution; the cylinder switch was switched on so that the stirring propeller stirred the sediments to be separated for 2-3 min; the sediments to be separated were then settled for solid-liquid stratification; the baffle plate control knob was adjusted to make the central baffle plate in the separation cylinder vertical to the barrel body of the separation cylinder; the total volume of the sediments to be separated and the saturated NaCl solution did not exceed ⅔ of the volume of the separation cylinder;

(4) Collection: the aqueous filter membrane was laid over the filtration screen in the collection bottle; the separation cylinder and the collection bottle were connected and fixed through the bayonet; the welding nozzle was connected with the vacuum pump; the vacuum pump was switched on for suction filtration, upon which microplastics were collected over the aqueous filter membrane.

Compared with the prior art, beneficial effects of the invention are as below:

(1) Easy operation: Due to density differences, microplastics will be suspended at the liquid surface due to their low density and separated from other deposited sediments with higher density. They can be fully separated through the separation of the central baffle plate. The unit simplifies the operation steps, reduces the human intervention, and reduces the error caused by human factors.

(2) Economical and environment-friendly: The unit has no special material, which greatly reduces the manpower and material costs for detecting all suspected microplastics by microscopy and Fourier transform infrared spectroscopy; moreover, after use, the separation cylinder is opened and the sediments are directly poured into the double-layer vacuum filter to separate the sediments and recover the solution, which has the advantages of environmental protection and low-consumption.

(3) High separation efficiency: Compared with the collection efficiency in the traditional separation and extraction method, the integrated separation unit for microplastics mainly collect microplastics with particle size<0.1 mm. All the liquid in the upper part of the separation cylinder goes into the collection bottle for filtration over the filter membrane, therefore the recovery efficiency and operating efficiency are both significantly improved, and the sample collection capacity is also expanded.

(4) High durability: The central baffle plate used in the unit improves the durability of the separation unit, effectively preventing the unit from being damaged by dead branches, rocks, glass or other hard objects.

Wherein, A—holder, B—separation cylinder, C—collection bottle, 1—central baffle plate, 2—baffle plate control knob, 3—stirring blade, 4—filtration screen, 5—welding nozzle, 6—neck, 7—inner bottom of the separation cylinder, 8—filter membrane, 9—vacuum pump, 10—cylinder switch, 11—rotating shaft, 12—motor.

DESCRIPTION OF THE EMBODIMENTS

The present invention will be further illustrated accompanying with the appended drawings and embodiments. The following embodiments are used to further explain the present invention, but not limit the scope of the invention.

Figure 1:
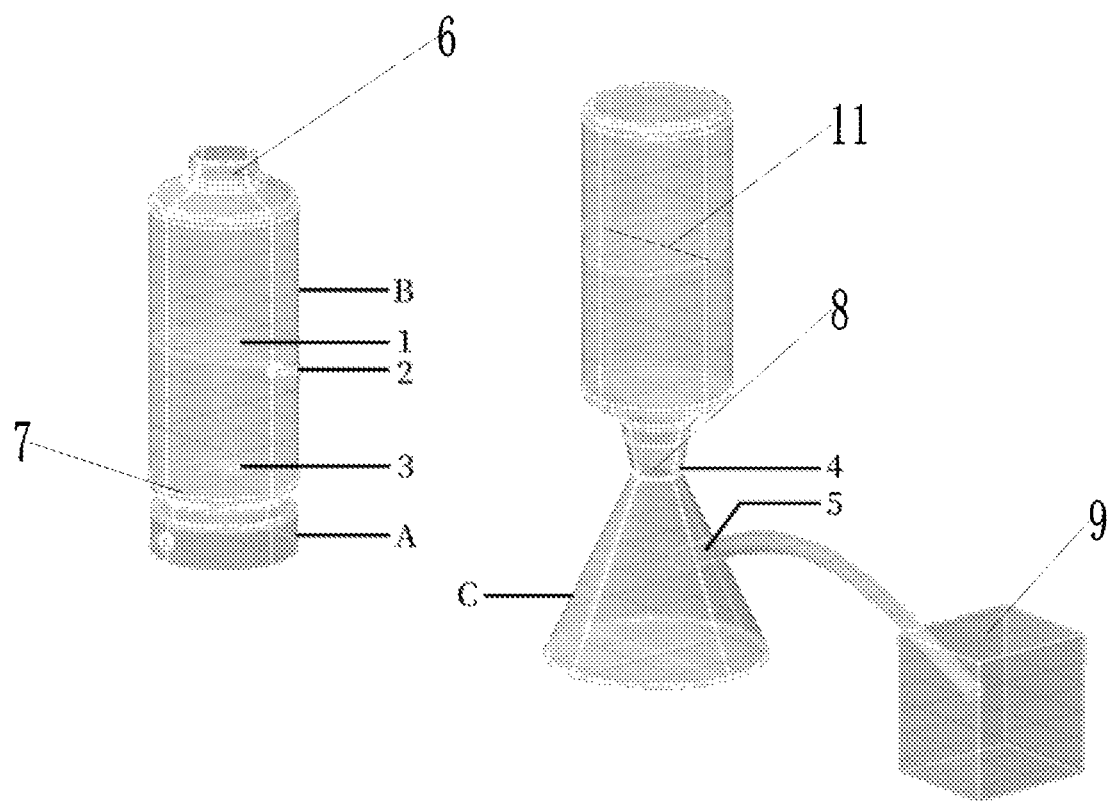
FIG. 1 is a structural representation showing the unit of the invention.
Figure 4:
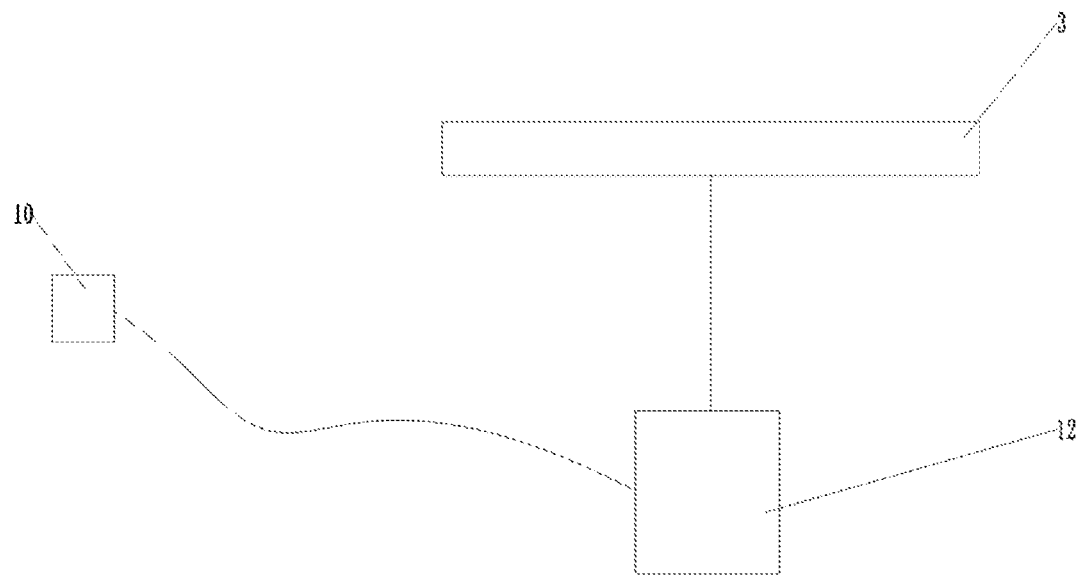
FIG. 4 is a schematic diagram showing a stirring blade, a cylinder switch and a motor.

As shown in FIG. 1, it is a structural representation showing the integrated separation unit for microplastics of the invention. The unit includes: a holder A, a separation cylinder B, a collection bottle C, a central baffle plate 1, a baffle plate control knob 2, a stirring propeller 3, a motor 12, a cylinder switch 10, a filtration screen 4, a welding nozzle 5, a filter membrane 8 and a vacuum pump 9; the holder A is connected to one end of the separation cylinder B through screw threads, so that the separation cylinder B is stable and does not fall down when stirred; the other end of the separation cylinder B is connected to the collection bottle C through a bayonet. The collection bottle C used for vacuum suction filtration can be made of chemically inert glass material or PTFE material by technicians in this field. After the sediments are poured into the separation cylinder B, the central baffle plate 1 of the separation cylinder B is erected inside the separation cylinder B and is parallel to the separation cylinder B. The saturated NaCl solution is added into the separation cylinder B and mixed with the sediments. The motor is switched on to stir the sediments, so that microplastics can be centrifugally floated on the liquid surface; Solid-liquid stratification occurs after standing, microplastics and other low-density debris less than 5 mm can be separated from the sediments and suspended to the upper part of the separation cylinder B based on the density separation method; the central baffle plate 1 is rotated slowly until it is vertical to the separation cylinder B, so that the upper and lower chambers of the separation cylinder B are completely separated. Therefore, the integrated separation unit for microplastics is a device for separating microplastics based on centrifugal flotation and the density separation method. The inner bottom 7 of the separation cylinder B is provided with a stirring propeller 3. As shown in FIG. 4, the stirring propeller 3 is connected to a motor 12. The cylinder switch 10 is arranged on the outer wall of the separation cylinder B. The motor is connected with the cylinder switch. The motor is an n20 DC geared micro-motor (6V). The central baffle plate 1 is arranged in the inner center of the separation cylinder B, and the central baffle plate 1 is circular. A rotating shaft 11 is arranged along one diameter of the central baffle plate 1, one end of the rotating shaft passes through the separation cylinder B and connected with the baffle plate control knob 2. The baffle plate control knob 2 controls the rotation of the rotating shaft and drives the central baffle plate 1 to flip inside the separation cylinder B, so that the central baffle plate 1 can be flipped to parallel or vertical to the separation cylinder B. When the central baffle plate 1 is flipped to be vertical to the separation cylinder B, the separation cylinder B is equally divided into upper and lower chambers. A filtration screen 4 is arranged at the neck 6 of the collection bottle C. The filtration screen 4 is a glass sand core filtration screen. The filtration screen 4 is provided with a filter membrane. The filter membrane is an aqueous filter membrane. The aperture of the filter membrane is selected from 0.15 μm, 0.22 μm, 0.45 μm, 0.80 μm or 1.20 μm. A welding nozzle 5 is arranged at the lower side of the collection bottle C. The welding nozzle is made of the same material as the collection bottle C. The welding nozzle 5 is connected with the vacuum pump, by which microplastics are separated and adsorbed onto the filter membrane through suction filtration.

The operation principle of the integrated separation unit for microplastics of the invention is as below: microplastics usually refer to plastic products or plastic scraps less than 5 mm; based on the principle of centrifugal flotation and density separation, using the unit of the invention, the sediments to test are firstly settled naturally, allowing particles or fibers less than 5 mm to float up to the upper part of the separation cylinder B, thus achieving preliminary separation by means of the central baffle plate 1; after then, suction filtration is performed through the microporous filter membrane with the purpose of removing water, therefore allowing microplastic particles or fibers to be separated and adsorbed onto the microporous filter membrane for collection in order to be further determined by microscopy and Fourier transform infrared spectroscopy.

Embodiment 1

A microplastic collection experiment conducted on the coastal sediments from waters of Zhoushan, Zhejiang, East longitude 122°09.344, North latitude 29°51.531, was taken as an example:

(1) Sampling: A stretch of coast was randomly selected for sampling to obtain sediment samples.

(2) Pre-treatment: The debris in the sediment samples, such as large plastics, dead branches, rocks, glass or others, was filtered out over 5-mesh stainless steel screens. The sediments were identified as quartz sand. 100.00 g of the sediments were weighed, dried at 110° C. for 2 h, taken out and cooled to obtain the sediments to be separated, which was weighed again as 96.41 g, so the water content was calculated as 3.59%.

(3) Separation: The baffle plate control knob 2 was adjusted to make the central baffle plate 1 in the separation cylinder B parallel to the barrel body of the separation cylinder B; the above obtained sediments to be separated were poured into the separation cylinder B, into which was also added the saturated NaCl solution; the cylinder switch was switched on so that the stirring propeller 3 stirred the sediments for 2 min; the sediments to be separated were then settled for solid-liquid stratification; the baffle plate control knob 2 was adjusted to make the central baffle plate 1 in the separation cylinder B vertical to the barrel body of the separation cylinder B; the total volume of the sediments to be separated and the saturated NaCl solution was ⅔ of the volume of the separation cylinder B.

(4) Collection: the aqueous filter membrane of 0.15 μm was laid over the center of the filtration screen 4 in the collection bottle C, which was wetted with distilled water so that it fitted perfectly with the screen; the separation cylinder B was inverted and connected with the collection bottle C through a bayonet; the welding nozzle 5 of the collection bottle C is connected to the rubber hose of the vacuum pump; the vacuum pump was switched on for suction filtration for 5 min. The rubber hose of the vacuum pump was removed and the vacuum pump was shut off. The collection bottle C was taken out. The aqueous microporous filter membrane on the collection bottle C was washed with distilled water for three times. The suction filtration was conducted by the vacuum pump again for 5 min and then the vacuum pump was shut off. Microplastics were collected on the 0.15 μm aqueous filter membrane.

Figure 2:
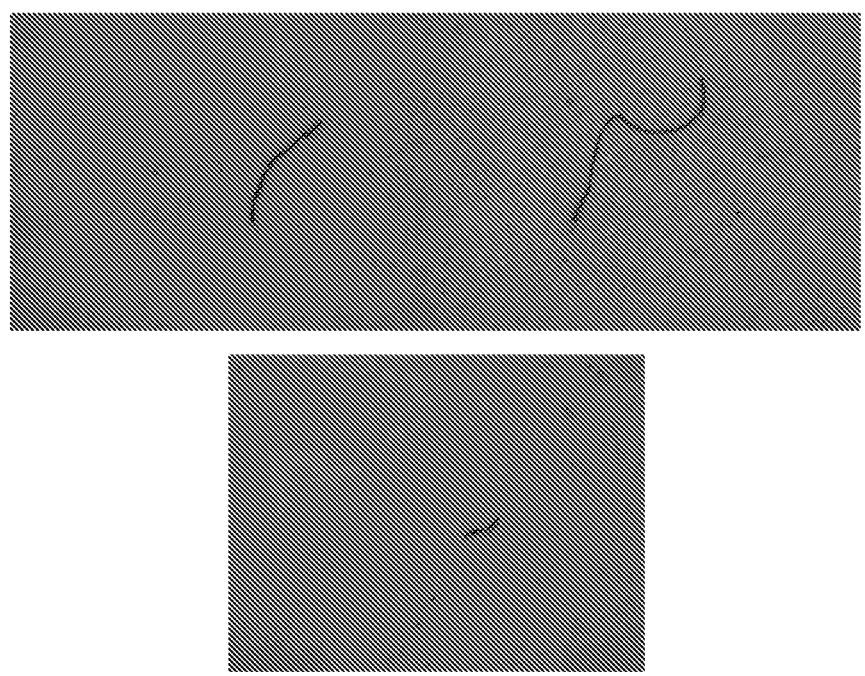
FIG. 2 is the microscopic image of microplastics according to Embodiment 1.

The microplastics collected by the above method were observed under a microscope, with the results shown in FIG. 2. They were determined as microfibers, which were linear in shape, without bending or winding, and the thickness of each fiber was uniform.

Embodiment 2

A microplastic collection experiment conducted on the coastal sediments from waters of Nanji Island, Zhejiang, East longitude 122°06.805, North latitude 27°46.045, was taken as an example:

(1) Sampling: A stretch of coast was randomly selected for sediment sampling to obtain sediment samples.

(2) Pre-treatment: The debris in the sediment samples, such as large plastics, dead branches, rocks, glass or others, was filtered out over 1-mesh stainless steel screens. The sediments were identified as mixtures of quartz sand and gravel. 300.00 g of the sediments were weighed, dried at 100° C. for 1 h, taken out and cooled to obtain the sediments to be separated, which was weighed again as 290.02 g, so the water content was calculated as 3.32%.

(3) Separation: The baffle plate control knob 2 was adjusted to make the central baffle plate 1 in the separation cylinder B parallel to the barrel body of the separation cylinder B; the above obtained sediments to be separated were poured into the separation cylinder B, into which was also added the saturated NaCl solution; the cylinder switch was switched on so that the stirring propeller 3 stirred the sediments for 3 min; the sediments to be separated were then settled for solid-liquid stratification; the baffle plate control knob 2 was adjusted to make the central baffle plate 1 in the separation cylinder B vertical to the barrel body of the separation cylinder B; the total volume of the sediments to be separated and the saturated NaCl solution was ⅔ of the volume of the separation cylinder B.

(4) Collection: the aqueous filter membrane of 1.20 μm was laid over the center of the filtration screen 4 in the collection bottle C, which was wetted with distilled water so that it fitted perfectly with the screen; the separation cylinder B was inverted and connected with the collection bottle C through a bayonet; the welding nozzle 5 of the collection bottle C is connected to the rubber hose of the vacuum pump; the vacuum pump was switched on for suction filtration for 5 min. The rubber hose of the vacuum pump was removed and the vacuum pump was shut off. The collection bottle C was taken out. The aqueous microporous filter membrane on the collection bottle C was washed with distilled water for three times. The suction filtration was conducted by the vacuum pump again for 5 min and then the vacuum pump was shut off. Microplastics were collected on the 1.20 μm aqueous filter membrane.

Figure 3:
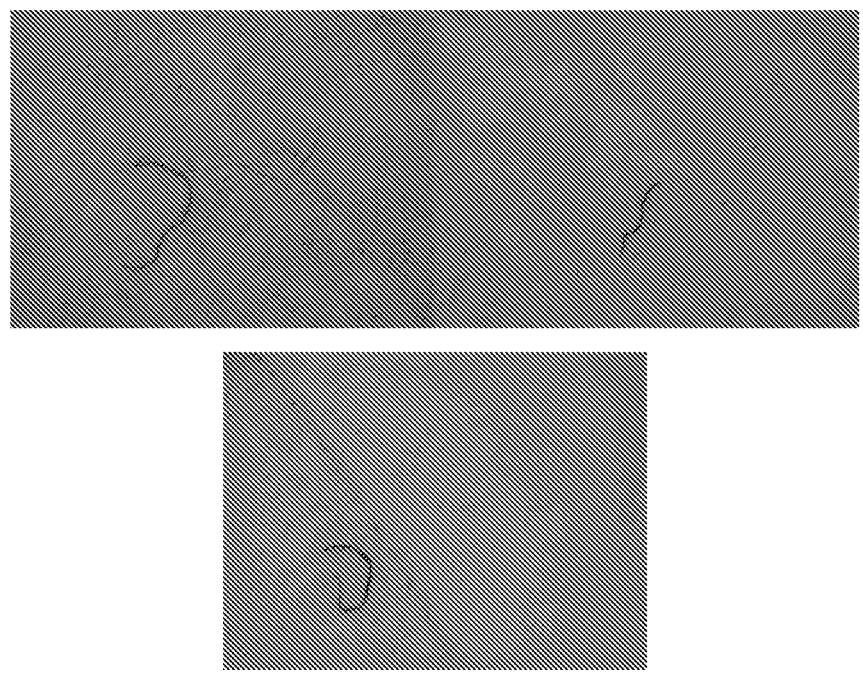
FIG. 3 is the microscopic image of microplastics according to Embodiment 2.

The above collected microplastics were observed under a microscope, with the results shown in FIG. 3. They were determined as microfibers, which were linear in shape, without bending or winding, and the thickness of each fiber was uniform.

Embodiment 3

The separation performance of the integrated separation unit of the invention is compared with those of pipette filtration, density method and direct dumping method.

(1) Sample Collection

The sampling sites and grouping of sediments are shown in Table 1:

TABLE 1

Sampling sites and grouping of submarine sediments

| Sampling sites | Longitude and Latitude | Total Amount | | | | Separation Method |
|---|---|---|---|---|---|---|
| | | <0.1 mm | 0.1~0.315 mm | 0.315~0.5 mm | 0.5~1 mm | |
| 1 | East longitude 122°09.344 | \ | 100 g | 500 g | 76 g | Integrated separation unit |
| | North latitude 29°51.531 | 7 g | 200 g | 500 g | 76 g | Pipette filtration |
| | | 7 g | 100 g | 500 g | \ | Direct dumping |
| | | \ | \ | \ | 76 g | Density method |
| 2 | East longitude 122°09.761 | \ | 70 g | 500 g | 170 g | Integrated separation unit |
| | North latitude 29°50.501 | 3 g | 70 g | 500 g | 170 g | Pipette filtration |
| | | 3 g | 70 g | 500 g | \ | Direct dumping |
| | | \ | \ | \ | 170 g | Density method |
| 3 | East longitude 122°10.251 | \ | 200 g | 500 g | 170 g | Integrated separation unit |
| | North latitude 29°51.552 | 11 g | 200 g | 500 g | 170 g | Pipette filtration |
| | | 11 g | 200 g | 500 g | \ | Direct dumping |
| | | \ | \ | \ | 170 g | Density method |

(2) Experimental Methods

All the samples were divided into large particle size (>0.5 mm) and small particle size (<0.5 mm) through the screen, from which microplastics were extracted by employing four methods including separation with the integrated separation unit, pipette filtration, density method, and direct dumping method.

Method ①: Separation with the integrated separation unit, employing the method of Embodiment 1

Method ②: Pipette filtration

The debris in the tested sediments, such as large plastics, dead branches, rocks, glass or others, was filtered out over 5-mesh stainless steel screens. The sediments were identified and weighed, dried at 110° C. for 2 h, taken out and cooled, and then weighed again to calculate the water content. Then, 15 mL soil samples were taken each time and placed in a test tube, into which was added an appropriate amount of saturated NaCl solution (1000 mL distilled water, 360 g sodium chloride crystal) and stirred uniformly. After adjusting the quality of each test tube (ensuring that the quality of each test tube is equal as far as possible), they were placed into a centrifuge for centrifugation (4000 rpm, 5 min). The suction filter device was provided with a filter membrane. An appropriate amount of supernatant was taken using a pipette and passed through the filter membrane, then suction filtered with the vacuum pump and further suction filtered by adding distilled water to wash NaCl particles repeatedly for several times, to obtain the filter membrane samples, which were packaged in a filter membrane storage box and observed under a microscope.

Method ③: Direct dumping method

The debris in the tested sediments, such as large plastics, dead branches, rocks, glass or others, was filtered out over 5-mesh stainless steel screens. The sediments were identified and weighed, dried at 110° C. for 2 h, taken out and cooled, and then weighed again to calculate the water content. Then, 15 mL soil samples were taken each time and placed in a test tube, into which was added an appropriate amount of saturated NaCl solution (1000 mL distilled water, 360 g sodium chloride crystal) and stirred uniformly. After adjusting the quality of each test tube (ensuring that the quality of each test tube is equal as far as possible), they were placed into a centrifuge for centrifugation (4000 rpm, 5 min). The suction filter device was provided with a filter membrane. The supernatant of the centrifuge tube was collected and suction filtered with the vacuum pump, and further suction filtered by adding distilled water to wash NaCl particles repeatedly for several times, to obtain the filter membrane samples, which were packaged in a filter membrane storage box and observed under a microscope.

Method ④: Density method

The debris in the tested sediments, such as large plastics, dead branches, rocks, glass or others, was filtered out over 5-mesh stainless steel screens. The sediments were identified and weighed, dried at 110° C. for 2 h, taken out and cooled, and then weighed again to calculate the water content. Then, soil samples were poured into a volumetric flask, into which was also added an appropriate amount of saturated NaCl solution (1000 mL distilled water, 360 g sodium chloride crystal) and stirred uniformly. The volumetric flask was inverted slowly and placed on the iron stand to set. When the solution was obviously stratified, the lower sediments were removed, the upper solution was taken and filtered with filter papers (distilled water was added to remove NaCl particles). The filtered samples were transferred into alcohol. The lower solution and sediments were taken and filtered with filter papers. Finally, the filter papers were dried in a culture dish to obtain the suspected microplastic samples, which were observed under a microscope.

(3) Experimental results

The abundances (n/kg) of each group of microplastics obtained through experiments were shown in Tables 2-5:

TABLE 2

Abundance (n/kg) of microplastics obtained by the integrated separation unit

| Integrated separation unit | <0.1 mm | 0.1~0.315 mm | 0.315~0.5 mm | 0.5~1 mm |
|---|---|---|---|---|
| 1 |  | 180 | 267 | 351 |
| 2 |  | 678 | 210 | 209 |
| 3 |  | 381 | 182 | 214 |

TABLE 3

Abundance (n/kg) of microplastics obtained by the pipette filtration method

| Pipette filtration | <0.1 mm | 0.1~0.315 mm | 0.315~0.5 mm | 0.5~1 mm |
|---|---|---|---|---|
| 1 | 2142 | 271 | 170 | 131 |
| 2 | 1865 | 514 | 156 | 176 |
| 3 | 1090 | 437 | 100 | 82 |

TABLE 4

Abundance (n/kg) of microplastics obtained by the direct dumping method

| Direct dumping method | <0.1 mm | 0.1~0.315 mm | 0.315~0.5 mm | 0.5~1 mm |
|---|---|---|---|---|
| 1 | 1285 | 267 | 160 |  |
| 2 | 2053 | 328 | 207 |  |
| 3 | 727 | 233 | 90 |  |

TABLE 5

Abundance (n/kg) of microplastics obtained by the density method

| Density method | <0.1 mm | 0.1~0.315 mm | 0.315~0.5 mm | 0.5~1 mm |
|---|---|---|---|---|
| 1 |  |  |  | 289 |
| 2 |  |  |  | 215 |
| 3 |  |  |  | 127 |

Microplastics were classified according to their morphological and structural characteristics by visual inspection (i.e. direct visual observation or with the assistance of microscope). Generally, three experimenters were randomly selected for observation: linear microplastics with uniform thickness and greater length than width were identified as fibrous microplastics; microplastics with clear boundary, uniform color and similar length and width were identified as granular microplastics; flaky or laminar microplastics were identified as membranous microplastics. It was shown from the experimental results that in all the samples, fibrous microplastics accounted for the largest proportion (46.91%), followed by membranous microplastics (40.74%) and granular microplastics (12.35%), wherein fibrous microplastics had the highest abundance value; with the increase of the particle size of microplastics, the number of microplastics decreased. Different separation methods were compared, with the conclusions shown below:

Methods separation with the integrated separation unit, ② pipette filtration, ③ direct dumping method and ④ density method all can achieve effective separation of microplastics in the submarine sediments. It can be seen from the analysis of Table 6 that, for the main research group of microplastics at present (particle sizes of 0.5~1 mm), the overall recovery efficiency and operating efficiency of the method ① separation with the integrated separation unit were superior to those of other three methods.

TABLE 6

Comparison of abundances (n/kg) of the main research group of microplastics (particle sizes of 0.5~1 mm) collected by different methods

| 0.5~1 mm | Pipette filtration | Integrated separation unit | Density method |
|---|---|---|---|
| 1 | 131 | 351 | 289 |
| 2 | 176 | 209 | 215 |
| 3 | 82 | 214 | 127 |

What is claimed is:

1. An integrated separation unit for microplastics in coastal sediments, comprising:
a holder, a separation cylinder, a collection bottle, a central baffle plate, a baffle plate control knob, a stirring propeller, a motor, a cylinder switch, a filtration screen, a welding nozzle, a filter membrane and a vacuum pump; wherein the holder is threadedly connected to one end of the separation cylinder, and the other end of the separation cylinder is in a bayonet connection to the collection bottle; an inner bottom of the separation cylinder is provided with the stirring propeller, the stirring propeller is connected to the motor, the cylinder switch is arranged on an outer wall of the separation cylinder, and the motor is connected with the cylinder switch; the central baffle plate is arranged in an inner center of the separation cylinder, the central baffle plate is circular, a rotating shaft is arranged along a radial direction of the central baffle plate, one end of the rotating shaft passes through the separation cylinder and is connected with the baffle plate control knob; the filtration screen is arranged at a neck of the collection bottle, and the filtration screen is provided with the filter membrane, the welding nozzle is arranged at a lower side of the collection bottle, and the welding nozzle is connected with the vacuum pump.

2. The integrated separation unit for microplastics according to claim 1, wherein a diameter of the central baffle plate is equal to an inner diameter of the separation cylinder.

3. The integrated separation unit for microplastics according to claim 1, wherein the filter membrane is an aqueous filter membrane.

4. The integrated separation unit for microplastics according to claim 1, wherein apertures of the filter membrane are each of a size selected from 0.15 μm, 0.22 μm, 0.45 μm, 0.80 μm or 1.20 μm.

5. The integrated separation unit for microplastics according to claim 3, wherein the apertures of the filter membrane are each of a size selected from 0.15 μm, 0.22 μm, 0.45 μm, 0.80 μm or 1.20 μm.

6. A method of collecting microplastics using an integrated separation unit for microplastics, wherein the integrated separation unit for microplastics comprises:
a holder, a separation cylinder, a collection bottle, a central baffle plate, a baffle plate control knob, a stirring propeller, a motor, a cylinder switch, a filtration screen, a welding nozzle, a filter membrane and a vacuum pump; wherein the holder is threadedly connected to one end of the separation cylinder, and the other end of the separation cylinder is in a bayonet connection to the collection bottle; an inner bottom of the separation cylinder is provided with the stirring propeller, the stirring propeller is connected to the motor, the cylinder switch is arranged on an outer wall of the separation cylinder, and the motor is connected with the cylinder switch; the central baffle plate is arranged in an inner center of the separation cylinder, the central baffle plate is circular, a rotating shaft is arranged along a radial direction of the central baffle plate, one end of the rotating shaft passes through the separation cylinder and is connected with the baffle plate control knob; the filtration screen is arranged at a neck of the collection bottle, and the filtration screen is provided with the filter membrane, the welding nozzle is arranged at a lower side of the collection bottle, and the welding nozzle is connected with the vacuum pump, the method comprising the following steps:

(1) selecting water sampling sites to obtain sediment samples;

(2) pre-treating debris by filtering debris from sediment samples via 1-5 mesh stainless steel screens, drying the sediment samples filtered at 100-110° C. for 1-2 h, removing the debris and cooling it to room temperature to obtain the sediment samples to be separated;

(3) separating by adjusting the baffle plate control knob to cause the central baffle plate in the separation cylinder to be parallel to a barrel body of the separation cylinder; pouring the sediment samples to be separated obtained from step (2) and saturated NaCl solution into the separation cylinder; switching on the cylinder switch so that the stirring propeller stirs the sediment samples to be separated for 2-3 min; settling the sediment samples to be separated for solid-liquid stratification; adjusting the baffle plate control knob to cause the central baffle plate in the separation cylinder to be perpendicular to the barrel body of the separation cylinder; wherein a total volume of the sediment samples to be separated and the saturated NaCl solution do not exceed ⅔ of the volume of the separation cylinder; and, (4) collecting the sediment samples by laying the aqueous filter membrane over the filtration screen in the collection bottle; providing a bayonet connection between the separation cylinder and the collection bottle; connecting the welding nozzle with the vacuum pump; switching on the vacuum pump for suction filtration to enable collection of the microplastics as they are separated from the water in the sediment samples passing through the aqueous filter membrane.

* * * * *